March 11, 1958     R. A. CRUMBLISS     2,826,737
GENERATOR AND REGULATOR TESTER
Original Filed April 27, 1949
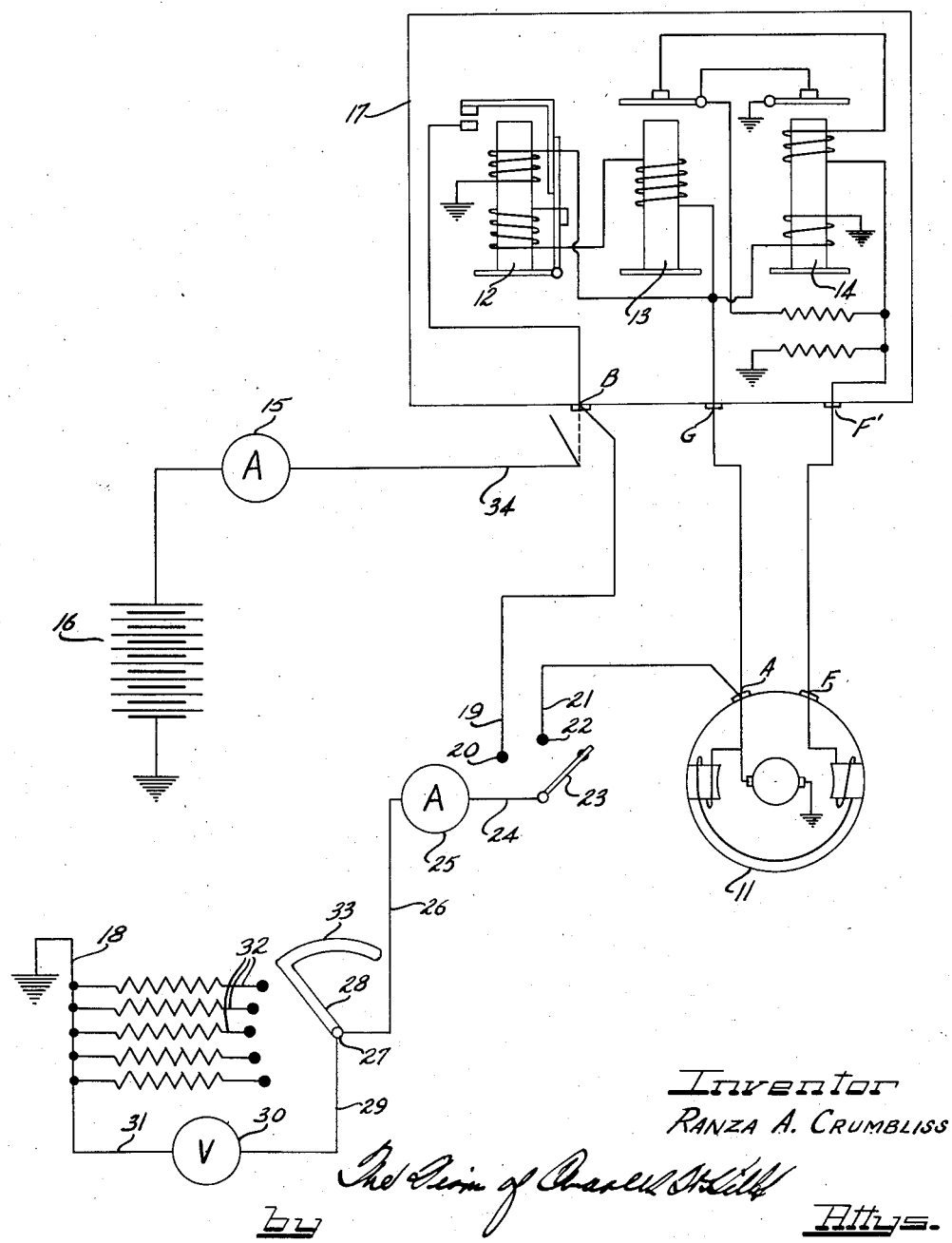
Inventor
RANZA A. CRUMBLISS United States Patent Office 2,826,737
Patented Mar. 11, 1958

2,826,737

GENERATOR AND REGULATOR TESTER

Ranza A. Crumbliss, Chicago, Ill.

Continuation of application Serial No. 89,879, April 27, 1949. This application March 8, 1954, Serial No. 414,673

3 Claims. (Cl. 324—28)

This invention relates to testing apparatus for testing the generator and regulator circuits of an automotive vehicle.

In the specification and drawings there is disclosed a generator and regulator circuit which is very commonly employed in automotive vehicles at the present time, consisting primarily of a generator, a voltage regulator, a current regulator and a cut out relay, all cooperating to provide for charging of a battery in the vehicle when the battery needs charging, to prevent the current from rising beyond a predetermined amperage in order to avoid too high a charging rate for the battery, and providing for voltage regulation of the system so that the voltage may not rise above a predetermined voltage.

As these regulators are subject to some adjustment and during service may get out of adjustment it becomes necessary from time to time to test these circuits to determine if the generator is working properly and if the regulator circuits are in proper order.

My invention provides a testing unit which may readily be connected to the circuits in the vehicle, and by simple manipulation of the testing apparatus one can determine whether the generator works properly, and whether the various relays in the vehicle circuit are properly adjusted. The testing apparatus provides means for testing the circuits leading from the generator to the regulator to determine whether these wires are themselves in proper working condition.

One of the objects of the invention is to provide a testing apparatus of the character described which may be connected to the generator and regulator circuits of an automotive vehicle without removing such equipment from the vehicle for test purposes.

Another object of the invention is to provide testing apparatus of the character described which afford means for determining the proper regulation of the adjustable portions of the generator and regulator circuits in a vehicle.

Another object of the invention is to provide a testing apparatus which can be connected to the generator and regulator circuits in an automotive vehicle for testing the latter without altering the permanent connections in the vehicle so that tests may be made under existing operating conditions.

Other objects and advantages of the invention will be mentioned hereinafter or will become apparent from a reading of the following specification.

In the single figure of drawings there is shown schematically a typical generator and regulator circuit for an automotive vehicle and the testing circuits of the testing apparatus comprising this invention.

Referring first to the circuits which are typical in the vehicle itself, these include a generator 11, the cut out relay 12, the current regulator relay 13 and the voltage regulator relay 14, together with the vehicle ammeter 15 and the vehicle battery 16.

As the invention does not consist of the vehicle circuits themselves, it will suffice merely to point out that the purpose of the voltage regulator is to prevent the voltage from rising above a predetermined maximum such as for example, 7 or 7½ volts, while the current regulator may be set to enable the generator to deliver a specified maximum such as 30 to 35 amperes, and the cut out relay, which is normally open when the vehicle motor is stopped and when the motor is running operates to close when the generator voltage rises to a predetermined voltage and opens when the generator voltage drops below a predetermined voltage. The ammeter 15 shown in the circuit diagram is ordinarily mounted on the dashboard where the driver can observe whether the generator is charging the battery or not. The regulator unit which is embraced within the rectangle 17 is a compact unit in a housing generally mounted under the hood in some location determined by the car manufacturer.

The generator shown is normally provided with two binding posts—F, the field binding post, and A the binding post connected with one armature brush, while on the exterior of the regulator housing there are usually provided binding posts here denoted as F', G and B. As is typical of the two brush generators the other armature brush is connected to ground.

Referring now to the testing apparatus comprising my invention, the equipment therein is shown only diagrammatically, but as may be surmised from the following description it is capable of being arranged in a small compact portable case. It includes a lead 18 which should be a flexible insulated wire several feet long with a common spring clip at the end for attachment to the frame of the automobile this being hereinafter referred to as the ground lead of the testing apparatus. A lead 19 is also provided which is connected to a binding post 20 in the testing apparatus and which is intended for connection to the battery binding post on the regulator circuit in the vehicle, that is the binding post B. The lead 21 connected to the contact 22 is intended for connection temporarily with the armature post A on the generator. A switch 23 shown diagrammatically enables one to select either with contact 22 or contact 20.

A lead 24 connects the switch 23 with an ammeter 25 in the tester while the lead 26 connects the ammeter with binding post 27 on a resistance switch 28. From the binding post 27 of the resistance switch another lead 29 is connected to the voltmeter 30 which is then connected by means of lead 31 to the lead 18.

A plurality of resistors such as 32 are arranged in the test box and each is provided with a contact post as shown over which the contact bar 33 of the resistance switch may be rotated. By using this type of switch two or more or all of the resistors may be connected in parallel between the ground lead and the binding post 27 of this switch. The total current load of all the resistors should be somewhat greater than the specified maximum setting of any current regulator or the maximum specified output of any generator to be tested.

When using the testing device the lead 18 should be clamped to the frame of the vehicle, thus providing a ground which is common to the ground of the circuits in the regulator circuits of the vehicle. Lead 21 may be connected first to binding post A on the generator and lead 19 may be connected at that time if desired to the binding post B on the vehicle regulator.

Accordingly, when the switch 23 is placed on contact 22 and the generator is running, current may then be caused to flow through the switch 23, ammeter 25 and voltmeter 30 to ground and through as many of the resistors as are at that time connected in the circuit by means of the switch 28.

The motor will be started and with the generator running at maximum speed, but with no resistance load connected to the generator by means of the testing apparatus, the voltage on the voltmeter 30 should be observed. If this voltage is higher than the maximum voltage at which the voltage regulator circuit is specified to operate, the voltage regulator may then be adjusted until the maximum voltage indicated equals whatever the manufacturer has determined should be the maximum voltage, for example, 7½ volts. To make sure that no charging of the battery is at that time imposing a load upon the generator, the lead 34 should be disconnected from binding post B on the regulator.

When the maximum voltage is properly set, resistance may gradually be cut in by rotation of the switch 28 and both the voltmeter 30 and ammeter 25 should then be observed. The switch 28 should be operated gradually to cut in more and more resistors to produce more and more current flow up to the maximum amount of current flow specified for the vehicle under test.

As more current load is added to the test circuit the generator voltage will drop enabling the regulator to let the generator deliver more current. The voltage regulator may be adjusted to cause the generator to deliver more or less current at a given voltage, as indicated on the ammeter and voltmeter of the tester.

If under maximum load conditions the ammeter 25 does not show the maximum specified current charge while the voltmeter 30 shows a voltage well below maximum setting for the vehicle circuit under test with the vehicle motor running at full speed, it will then be apparent that the generator is not delivering its rated output.

If it be suspected that the generator alone is at fault, the post F may be directly connected to ground on the frame of the vehicle by means of a jumper wire. The motor may then be operated and the output, if any, of the generator controlled solely by the testing apparatus will rise, in which case several resistors should be cut in immediately in order to prevent the voltage from rising unduly in the generator circuit.

If the voltage regulator is adjusted to limit the maximum voltage to 7½ volts when the generator is not charging the battery, this testing apparatus with all resistors out of circuit should show 7½ volts on the voltmeter and zero on the ammeter. If an ampere load is provided in the tester, as indicated on its ammeter, the voltmeter 30 should read about 7 volts.

To test the generator and current regulator simultaneously, rotate switch 23 to contact 20, causing the generator output to flow through the current regulator, binding post B and into the testing apparatus.

If the current regulator on the vehicle be properly adjusted to deliver 35 amperes, for example, at 6 volts, such a reading of 35 amperes on the tester ammeter should show when enough resistors are placed in circuit, while the tester voltmeter should show 6 volts or better. By adding more resistors in the circuit the current will increase until the maximum current of the circuit control is reached and the voltage will drop.

The foregoing instructions for the use of the testing apparatus apply to those vehicle circuits in which the positive post of the battery is grounded. However, certain cars on the market have the negative post of the battery grounded and when testing such cars the test lead 21 would be connected to ground and lead 18 connected either to the armature post A or regulator post B, as dictated by the needs of the testing operations. In that event lead 19 would not be used.

In the drawing in addition to the lead 18 for attachment to the frame of the vehicle, that is the ground lead, I show leads 19 and 21 which may selectively, but not simultaneously, be connected to the testing apparatus by means of the switch 23. It is also contemplated that only one lead may be used if desired, the switch 23 being eliminated, such single lead being substituted for leads 19 and 21, to be attached either to the generator post A or to the regulator post B. However, if desired and it is deemed more convenient, both leads 19 and 21 may be permanently provided on the testing apparatus and switch 23 be employed to select one or the other for use.

While there may be some variations in the vehicle charging circuits differing from that shown in the drawing, in general such differences as are embodied in the regulator circuits will not prevent the use of my testing apparatus in the manner described.

Furthermore, while I have shown and described in detail a preferred embodiment of the invention, it should be understood that some modifications may be made therein without departing from the spirit and scope of the invention defined in the appended claims.

This application is a continuation of application Serial Number 89,879, filed on April 27, 1949, now abandoned.

I claim:

1. Apparatus for testing conventional motor vehicle regulators without uncovering the regulators comprising, in combination, a generator having an armature terminal and a field terminal, a motor vehicle regulator having an armature post, a field post and a battery post, electrical conductors for connecting said armature terminal and said armature post and for connecting said field terminal and said field post, an ammeter, a plurality of resistors positioned for connection in parallel relation with respect to each other, said resistances being arranged and proportioned to provide no-load, full load and intermediate load conditions for said generator, a switch connected in series with said ammeter and operable to connect one or more ends of said parallel resistances to said generator through said regulator, means for connecting the opposite ends of said resistances to ground, an electrical conductor connected to said battery post and in series with said ammeter and said switch, and a voltmeter connected in parallel with said resistances.

2. Apparatus for testing conventional generators and motor vehicle regulators without uncovering the regulators comprising, in combination, a generator having an armature terminal and a field terminal, a motor vehicle regulator having an armature post, a field post and a battery post, electrical conductors for connecting said armature terminal and said armature post and for connecting said field terminal and said field post, an ammeter, a plurality of resistors positioned for connection in parallel relation with respect to each other, said resistances being arranged and proportioned to provide no-load, full load and intermediate load conditions for said generator, a switch connected in series with said ammeter operable to connect one or more ends of said resistances to said generator through said regulator, means for connecting the opposite ends of said resistances to ground, a second switch in series with said ammeter and said first switch, said switch having a pole connected to said battery post and a pole connected to said armature terminal whereby said generator and said regulator may be alternately tested, and a voltmeter connected in parallel with said resistances.

3. A method for testing conventional regulators for motor vehicles having a generator and a battery without removing the covers from said regulators, said regulators having a battery post, an armature post and a field post, the method comprising the steps of operating the motor of the motor vehicle to drive the generator of the motor vehicle so as to energize said generator, connecting the armature and field posts to the armature and field terminals, respectively, of said generator, disconnecting the battery post from said battery, connecting the battery post to a switch, connecting the switch to a plurality of resistances in parallel, connecting each of said plurality of resistances to ground, operating said switch to a no-load condition and measuring the voltage across the resistances to thereby check the voltage regulator in said regulator, then operating said switch to a full load condition and measuring the current through said resistances to thereby check the current regulator in said regulator.

References Cited in the file of this patent

UNITED STATES PATENTS

| 1,520,865 | Heyer | Dec. 30, 1924 |
| 1,772,217 | Heyer | Aug. 5, 1930 |
| 2,076,639 | Heyer | Apr. 13, 1937 |
| 2,084,086 | Heyer | June 15, 1937 |
| 2,096,131 | Oestermeyer | Oct. 19, 1937 |
| 2,352,499 | Sears | June 27, 1944 |

OTHER REFERENCES

Dyke's Automobile Encyclopedia, by A. L. Dyke, fifteenth edition, 1928, Goodheart-Willcox Co., publisher, pages 403 and 404.